United States Patent [19]
Farwell

[11] Patent Number: 6,079,154
[45] Date of Patent: Jun. 27, 2000

[54] PLANTER AND METHOD OF USE

[76] Inventor: Letitia E. Farwell, 799 Woodland Rd., Reedsville, Pa. 17084

[21] Appl. No.: 09/136,352

[22] Filed: Aug. 19, 1998

[51] Int. Cl.[7] ................................ A01G 5/00; A01G 9/02
[52] U.S. Cl. ......................... 47/66.7; 47/41.12; 47/41.11
[58] Field of Search .................................. 47/65.5, 41.01, 47/41.11, 41.12, 48.5, 79, 66.7, 25, 65.8; 206/423; 428/27; 211/60.1; 248/693

[56] References Cited

U.S. PATENT DOCUMENTS

| 451,645 | 5/1891 | Tudor | 47/41.11 |
|---|---|---|---|
| 2,150,550 | 3/1939 | Keller | 47/41.12 |
| 2,818,681 | 1/1958 | Coplen | 47/84 |
| 3,302,327 | 2/1967 | Fant . | |
| 3,591,442 | 7/1971 | Matesi | 428/10 |
| 4,092,801 | 6/1978 | Schoenherr et al. . | |
| 4,942,692 | 7/1990 | Colbert . | |
| 5,235,780 | 8/1993 | Colbert . | |
| 5,272,835 | 12/1993 | Stern | 47/79 |
| 5,425,204 | 6/1995 | Holmes et al. | 47/84 |
| 5,555,676 | 9/1996 | Lund . | |

FOREIGN PATENT DOCUMENTS

| 2454752 | 12/1980 | France | 47/41.12 |
|---|---|---|---|
| 1778554 | 12/1972 | Germany | 47/41.12 |
| 3614921 | 11/1987 | Germany | 47/41.12 |
| 332957 | 8/1930 | United Kingdom | 47/41.12 |
| 1400409 | 7/1975 | United Kingdom | 47/41.12 |
| 2086222 | 5/1982 | United Kingdom | 47/41.12 |

*Primary Examiner*—Michael J. Carone
*Assistant Examiner*—Fredrick T. French, III
*Attorney, Agent, or Firm*—John J. Elnitski, Jr.

[57] ABSTRACT

Disclosed is a planter which can be used as a living wreath. The planter eliminates the use of wire frames and moss to retain the soil in the frames. The planter provides a faster, easier and cleaner method of assembly than the prior art wire frames. It can be of different shapes and sizes. The main components of the planter are a U-channel shaped container, soil retention wrap, wrap retainer and an optional water source.

26 Claims, 9 Drawing Sheets

PLANTER AND METHOD OF USE

BACKGROUND OF THE INVENTION

It is known in the gardening and ornamental plant trade to assemble a living plant wreath by filling a wire frame with soil, and wrapping the soil filled frame with moss. Holes are then punched or cut into the moss for inserting plants or seeds. This assembly can then be hung as a decoration from a ceiling or a vertical surface such as a wall or a door. This assembly is commonly referred to as a living wreath and is used to maintain plants and flower arrangements for long periods of time by watering the soil. These wreaths are assembled by either the consumer or employees of a nursery. There have been many products introduced to improve the wire frame used to assemble the living wreath and also to improve the ease of assembly. Though these products have met with some success, they are still time consuming to assemble and can be a messy endeavor for the inexperienced assembler. For these reasons, it is desirable to reduce the time of assembly and mess produced by both the consumer or the nursery assembling the wreath.

It is an object of the present invention to provide a planter to retain soil in the planter while the planter is being hung from a ceiling or from a vertical surface.

It is another object of the present invention to provide a planter to be hung vertically which is easier to assemble.

SUMMARY OF THE INVENTION

The present invention is a planter for holding planting material in a vertical plane. The planter includes a container having two sides, a bottom and an open top. Where the sides and bottom are of a material to enclose and hold in place the planting material. The planter includes a soil retention wrap for wrapping around the container in order to retain the planting material in the container at the open top. Finally, the planter includes a wrap retainer extending from an outside surface of the container to retain the soil retention wrap around the container. The container is usually a U-channel and can be of a round, straight or curved configuration. The wrap retainer can be formed as part of the U-channel or separately attached to the U-channel.

DETAILED DESCRIPTION OF THE INVENTION

The present invention is a planter 10 which can be used as a living wreath, as shown in FIGS. 1–9. The planter 10 eliminates the use of wire frames and moss to retain the soil in the frames. The planter 10 provides a faster, easier and cleaner method of assembly than the prior art wire frames. It can be of different shapes and sizes. The main components of the planter are a U-channel shaped container 12, soil retention wrap 14, wrap retainer 16 and an optional water source 18.

Figure 1:
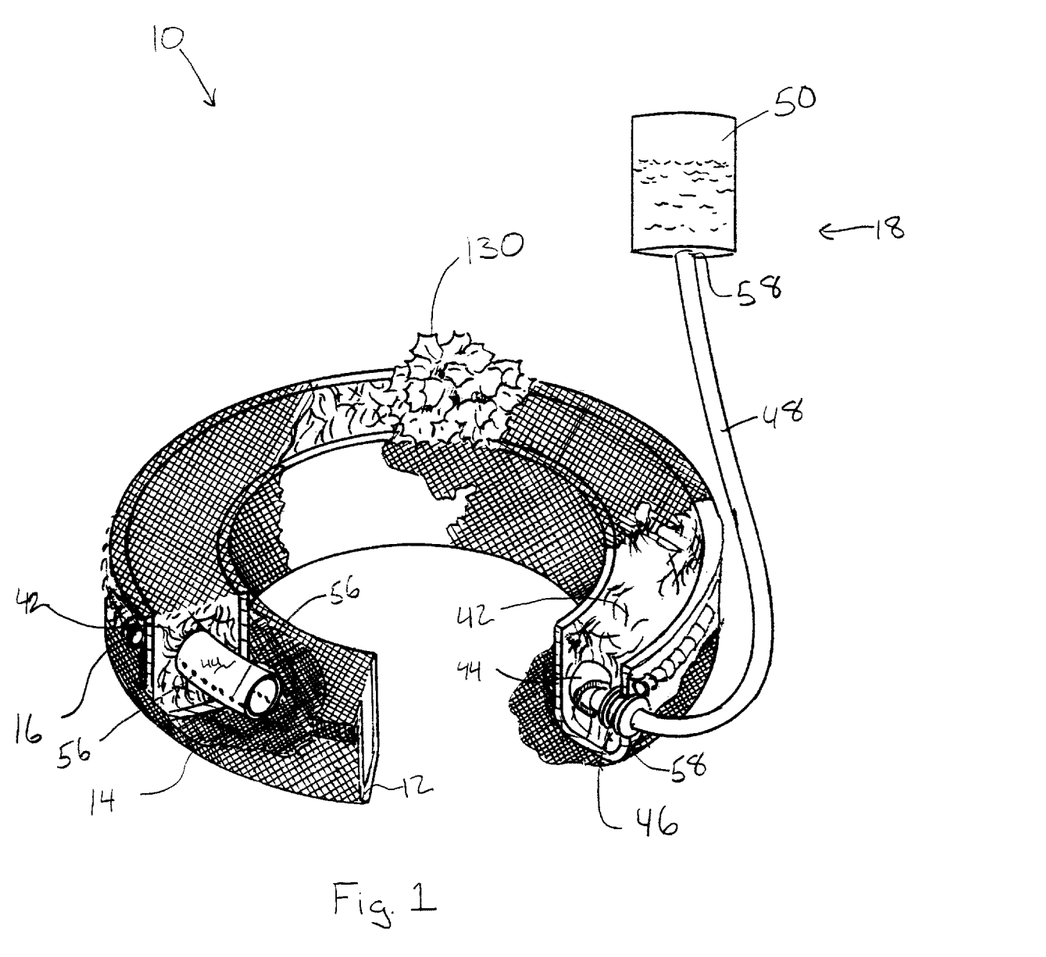
FIG. 1 is a perspective cutaway view of a planter according to the present invention.

The base of the planter 10 is the U-channel 12 as shown in FIGS. 1–9. The U-channel 12 can be of any length or shape configuration. Shown in FIGS. 1, 3 and 6–9 are examples of different U-channel configurations, such as round 20, straight 22 and curved 24. The round shape configuration 20 can be used to create a traditionally round wreath as shown in FIG. 1. The straight and curved configurations 22, 24 can be used along with the round configuration 20 to make letters or other shapes as shown in FIGS. 6–9. As shown in FIGS. 4 and 6–8, each U-channel 12 used to make up a letter has two closed ends 26. The use of the round, straight and curves configurations 20, 22, 24 allows for the production of floral signs and other unique floral arrangements that are only bounded by the imagination of the creator of the U-channel container 12. Different channels shapes could be used instead of the U-shape, but the U-shape provides a maximum receiving area for the materials to be placed inside of the channel 12.

Figure 2:
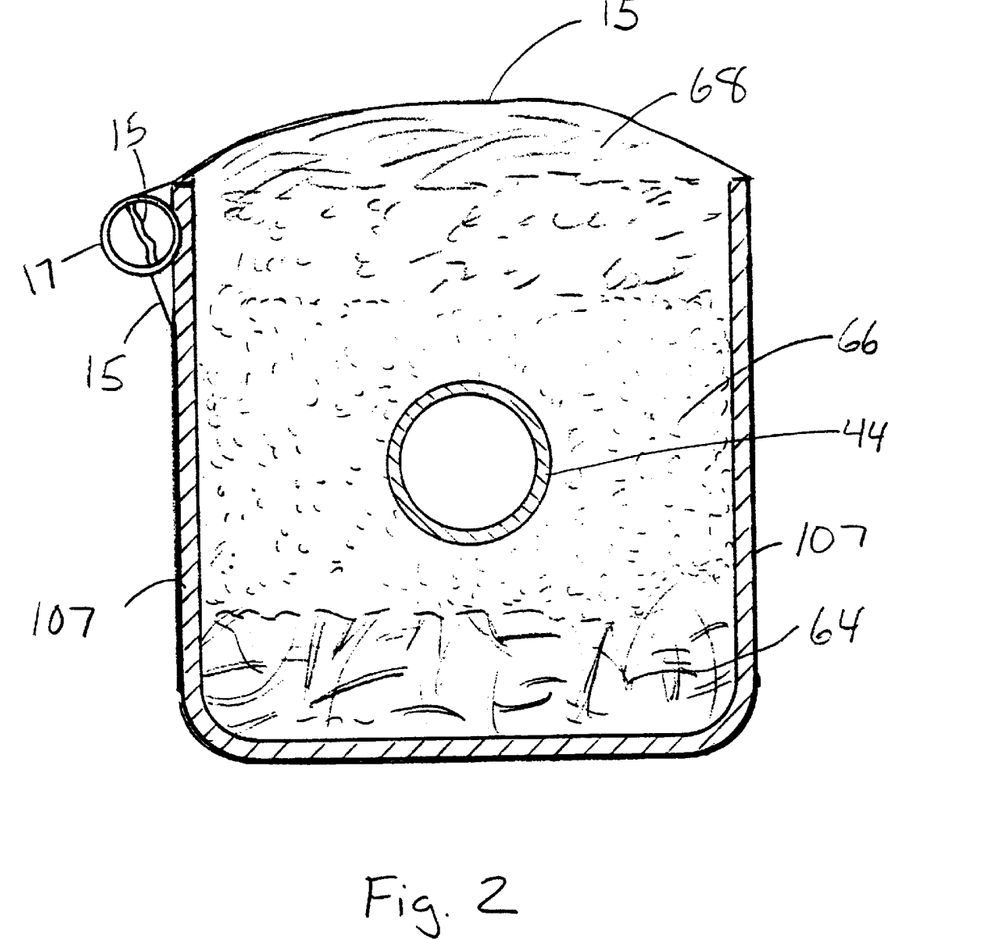
FIG. 2 is a side cross-sectional view of the planter according to the present invention.
Figure 3:
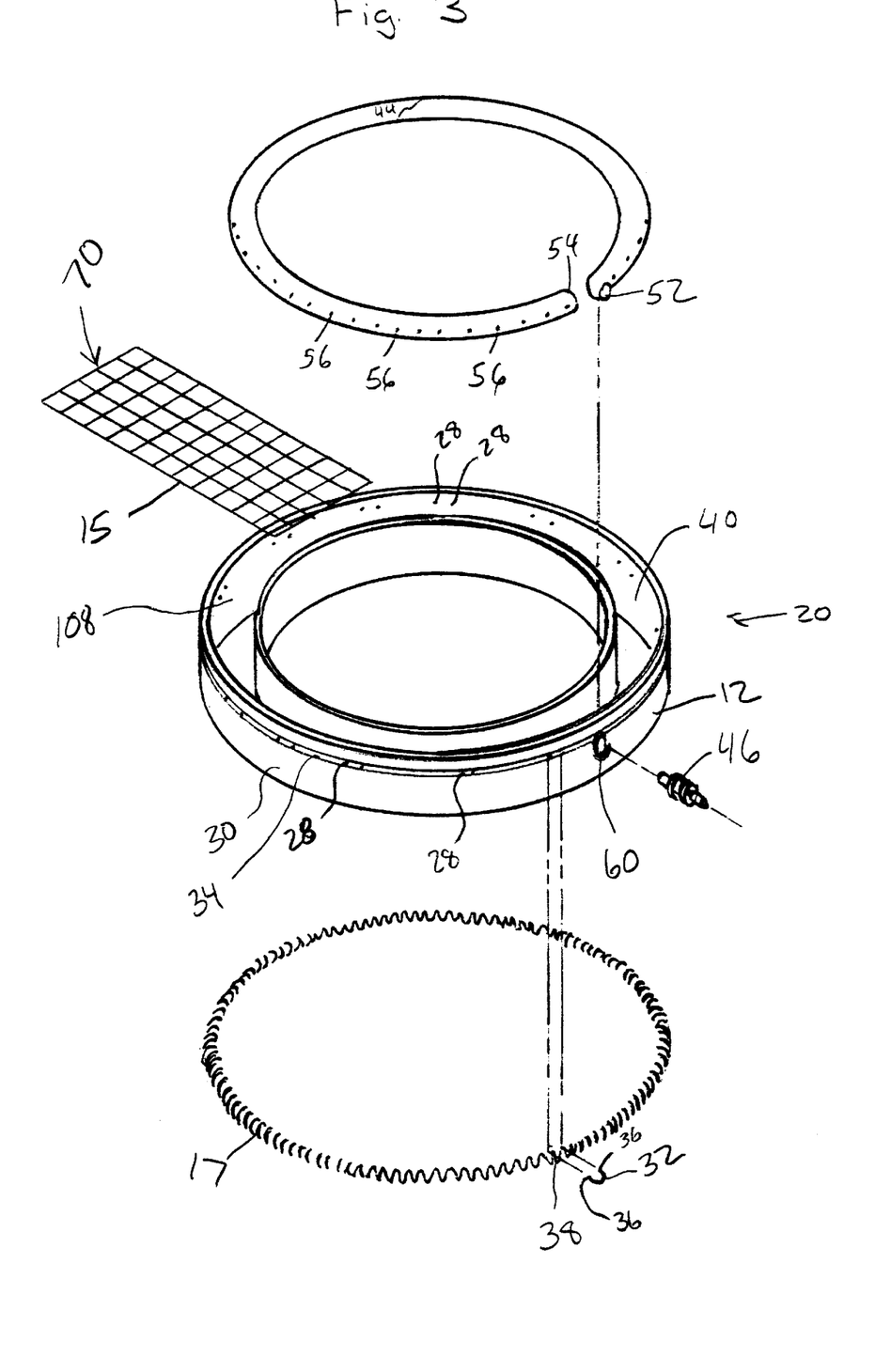
FIG. 3 is an exploded view of the main components of the planter according to the present invention.
Figure 4:
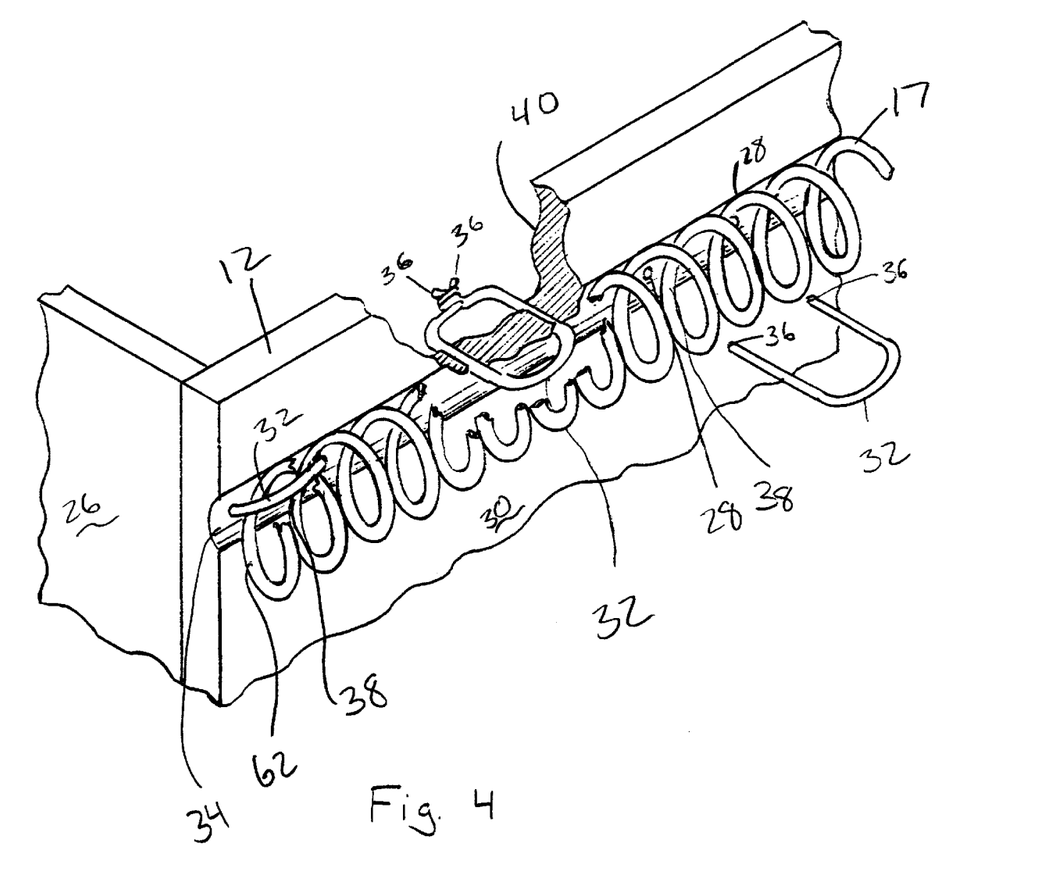
FIG. 4 is a perspective cutaway view of a wrap retainer and container according to the present invention.

The soil retention wrap 14 can be a variety of materials. Examples of suitable materials for the retention wrap 14 are netting, burlap, plastic and other fabrics. The wrap retainer 16 is positioned along the U-channel 12 and retains the soil retention wrap 14 around the U-channel 12. Examples of possible embodiments of the wrap retainer 16 are springs, hooks and clips. The wrap retainer 16 can be formed as part of the U-channel 12 or attached to the U-channel 12. The example discussed below includes netting 15 for the soil retention wrap 14 and a spring 17 for the wrap retainer 16. Use of the spring 17 requires wrap retainer fasteners to attach the spring 17 to the U-channel 12. Tie holes 28 along the outside surface 30 of the U-channel 12 are use with ties 32 to act as a wrap retainer fastener in order to mount the spring 17 to the U-channel 12. Optionally as shown in FIGS. 2–5, the U-channel 12 can include a groove 34 around an upper outside edge of the U-channel 12. The groove 34 receives and provides a nesting place for the spring 17. The spring 17 is tied along the U-channel 12 using the ties 32 which have two ends 36. Each end 36 of the tie 32 is placed around a coil 38 of the spring 17 and into one of the tie holes 28. Then, the tie ends 36 are twisted together on an inside surface 40 of the U-channel 12, as shown in FIG. 4.

The water source 18 is used to supply water to planting material 42 in the U-channel 12. The components of the water source 18 shown in FIGS. 1–3 includes a soaker hose 44, valve 46, outside hose 48 and a water container 50. The soaker hose 44 includes a water source connection end 52, plugged end 54 and a series of small holes 56 along the length of the soaker hose 44. The small holes 56 allow the slow release of water. The outside hose 48 is a solid hose having two open ends 58. The U-channel 12 shown includes a valve hole 60 to receive the valve 46. The connection end 52 of the soaker hose 44 attaches to the valve 46 from the inside of the U-shape channel 12. A first end 58 of the outside hose 48 attaches to the valve on the outside of the U-shape channel. A second end 58 of the outside hose attaches to a water source such as the water container 50 shown in FIG. 1.

Assembly and use of the planter 10 is as follows and will be describe in relation to the use of netting 15 for the soil retention wrap and a spring 17 for the wrap retainer. First, if the wrap retainer 16 is not part of the U-channel 12, the wrap retainer 16 must be attached to the U-channel 12. In the case of the spring 17 as the wrap retainer 17, the spring 17 is set into the groove 34. For a U-channel 12 which runs in a circle as shown in FIG. 3 and a spring 17 having its ends tie together, the tension of the spring 17 will hold the spring 17 against and around the U-channel 12. Next, the spring 17 is secured to the U-channel with ties 32 acting as the wrap retainer fasteners. In order to secure the spring 17, the ends 36 of the ties 32 can then be inserted around the spring coil 38 and into the tie holes 28 to be tied off on the inside surface 40 of the U-channel 12, as shown in FIG. 4. For the other configurations of the U-channel 12, such as the straight 22 or curved 24 pieces, the groove 34 and spring 17 would be on the outside portion of each U-channel 12 that makes up a shape, such as the letters shown in FIGS. 6–9. In this case the ends 62 of the spring 17 would be tied off with ties 32 at the ends 26 of each piece of U-channel 12 that makes up the total shape, as shown in FIG. 4.

After the wrap retainer 16 has been attached, the U-channel 12 is partially filled with planting material 42. FIG. 2 shows the U-channel 12 filled with the planting material 42 of a bottom layer of coco moss 64, a middle layer of soil 66 and a top layer of sheet moss 68. The planting material 42 as described above is used as an example, any known materials and methods can be substituted for the planting material 42. In the case as shown in FIG. 2, the bottom layer of coco moss 64 is added along with a partial amount of the middle layer of soil 66. If a soaker hose 44 not used, the valve hole 60 is plugged. If the soaker hose 44 is used, the valve 46 is installed in the valve hole 60. Next, an appropriate length of soaker hose 44 is laid into the U-channel 12 and the connection end 52 is attached to the valve 46. Then, the rest of the middle layer of soil 66 and top layer 68 are applied over the soaker hose 44. At this point, seeds can be added to the soil before the netting 15 is applied.

Figure 5:
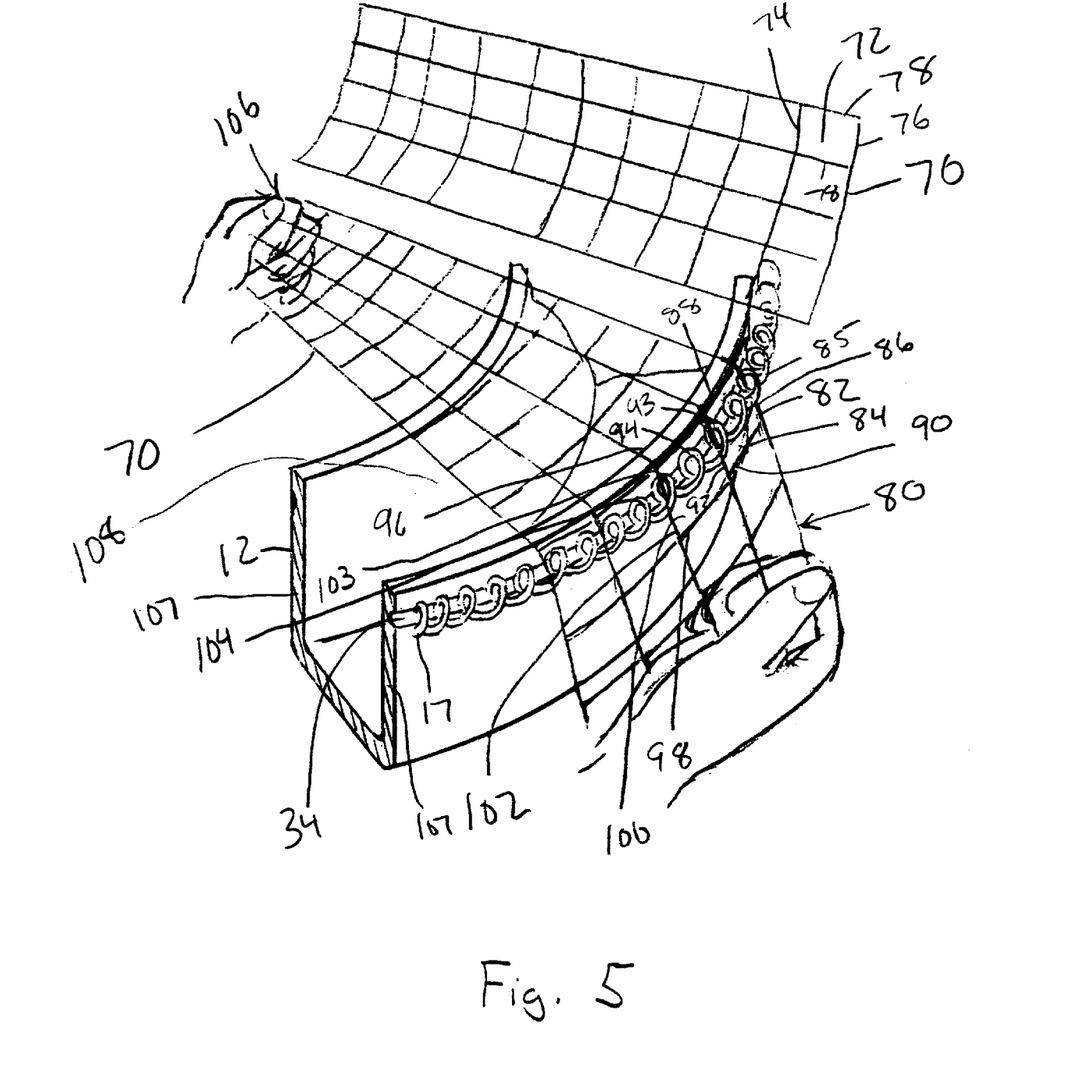
FIG. 5 is a perspective view of the attachment of a netting strip according to the present invention.

Once the U-channel 12 has be prepared and filled, the netting 15 is applied to hold the planting material 42 in place. The netting 15 is applied as shown in FIG. 5. The netting 15 is in the form of strips 70 which will wrap around the U-channel 12 as shown. The netting 15 includes netting holes 72, which are defined by an upper 74, lower 76 and side 78 strands of the netting 15. To apply the netting strip 70, a first end 80 of the netting strip 70 is attached to the spring 17. The first end 80 is attached by starting at a first side strand 82 of a first netting hole 84. The first side strand 82 is placed between two coils 85, 86 of the spring 17. The netting hole 84 is then stretched along the spring 17 until the upper 88 and lower 90 strands of the first hole 84 are taut. A second side strand 92 is placed between a second set of two coils 93, 94 of the spring 17. The netting strip 70 is then stretched again so that the upper 96 and lower 98 strands of an adjacent second netting hole 100, which shares the second side strand 92, are taut. Then, a third side strand 102, which also defines the second netting hole 100, is placed between a third set of two coils 103, 104 of the spring 17. This process is repeated until the width of the netting strip 70 has been applied along the spring 17. It is the tension inherent of the netting 15 which holds the first end 80 of the netting strip 70 to the spring 17. After the first end 80 of the netting strip 70 is attached to the spring 17, a second end 106 of the netting strip 70 is wrapped around the U-channel 12, so that part of the netting strip 70 covers the open area 108 of the U-channel 12. The second end 106 of the netting strip 70 is wrapped around the U-channel 12 towards the spring 17 until the netting strip 70 is taut around the U-channel 12. The netting holes 72 near the second end 106, which are closest to the spring 17, are applied over the spring 17 in the same manner described for attaching the first end 80 of the netting strip 70. Any excess netting 15 on the second end 106 of the netting strip 70, which extends pass the spring 17, is then removed by cutting. The actions of stretching of the first end 80 of the netting strip 70 over the spring 17, stretching the strip 70 around the U-channel 12 and stretching the second end 106 over the spring 17, all work together to retain the netting 15 around the U-channel 12. Also, FIG. 2 shows the planting material 42 in a mounded and compacted state which aids the soil retention wrap 14 in holding the planting material 42 in the U-channel 12. The process of applying the netting strip 70 is repeated with more netting strips 70, until the open area 108 of the U-channel 12 is covered and whereby each added strip 70 partially overlaps the previously added strip 70. The taut layer of netting strips 70 across the open area 108 of the U-channel 12 holds the planting material 42 in place. After applying the netting 15, plants 130 can be added to the planter 10 by placing the plant 130 within a netting hole 72 or cutting away a portion of the netting 15 to insert the plant 130.

As discussed above, the netting 15 and spring 17 are examples of the soil retention wrap 14 and wrap retainer 16. Other types of fabric can used and hooks or clips can be mounted to the U-channel 12 or manufactured as part of the U-channel 12. Another method (not shown) of attaching the soil retention wrap is to have two sets of wrap retainers, whereby there is a wrap retainer set on the outside of each upright 107 of the U-channel or a wrap retainer running along both sides of the open area 108. The retention wrap would be attached to one of the wrap retainer sets, drawn taut across the open area of the U-channel and finally attached to the other wrap retainer set. This would reduce the amount of soil retention wrap needed.

Figure 6:
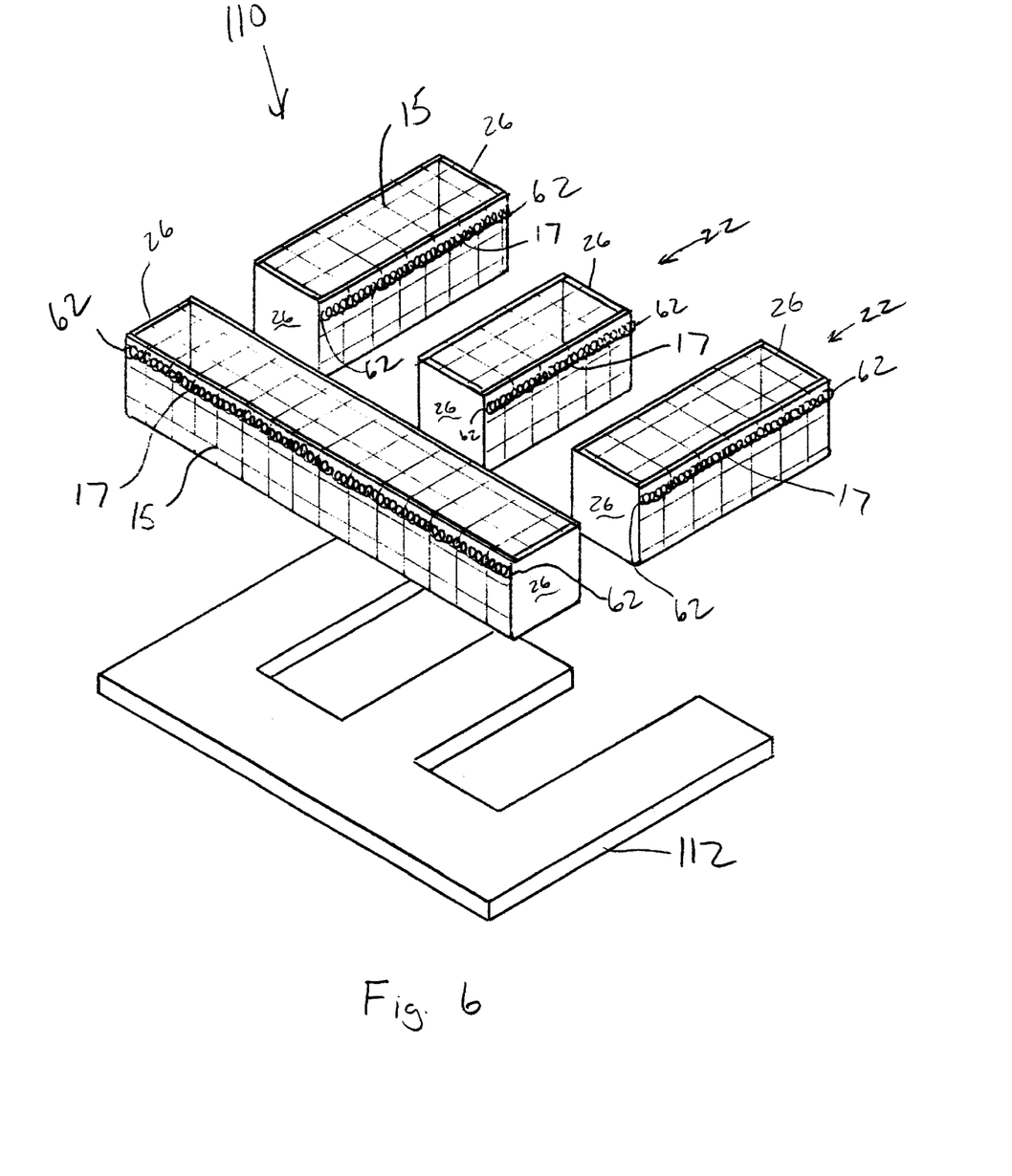
FIG. 6 is a perspective exploded view of a planter in the shape of an "E" according to the present invention.
Figure 7:
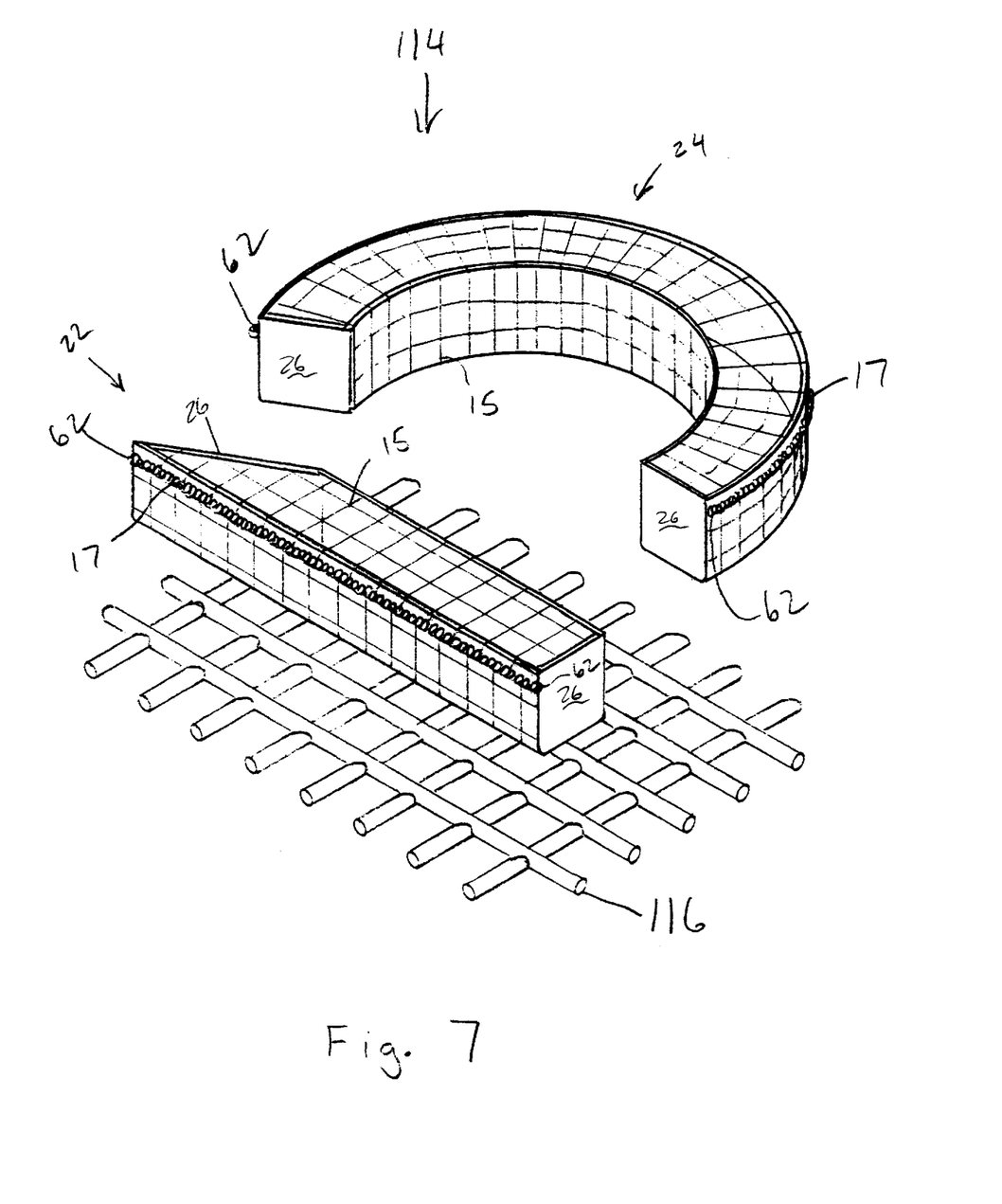
FIG. 7 is a perspective exploded view of a planter in the shape of an "D" according to the present invention.
Figure 8:
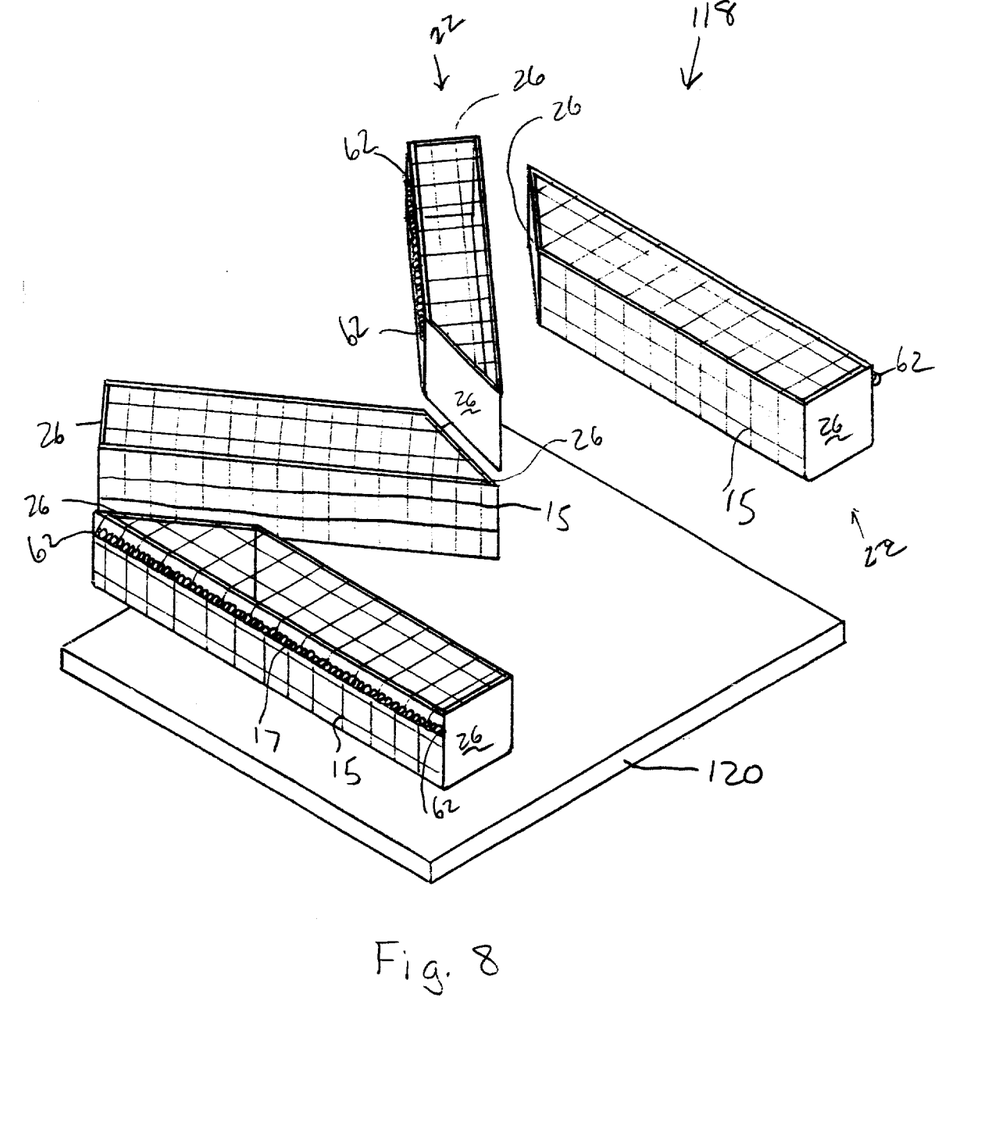
FIG. 8 is a perspective exploded view of a planter in the shape of an "M" according to the present invention.
Figure 9:
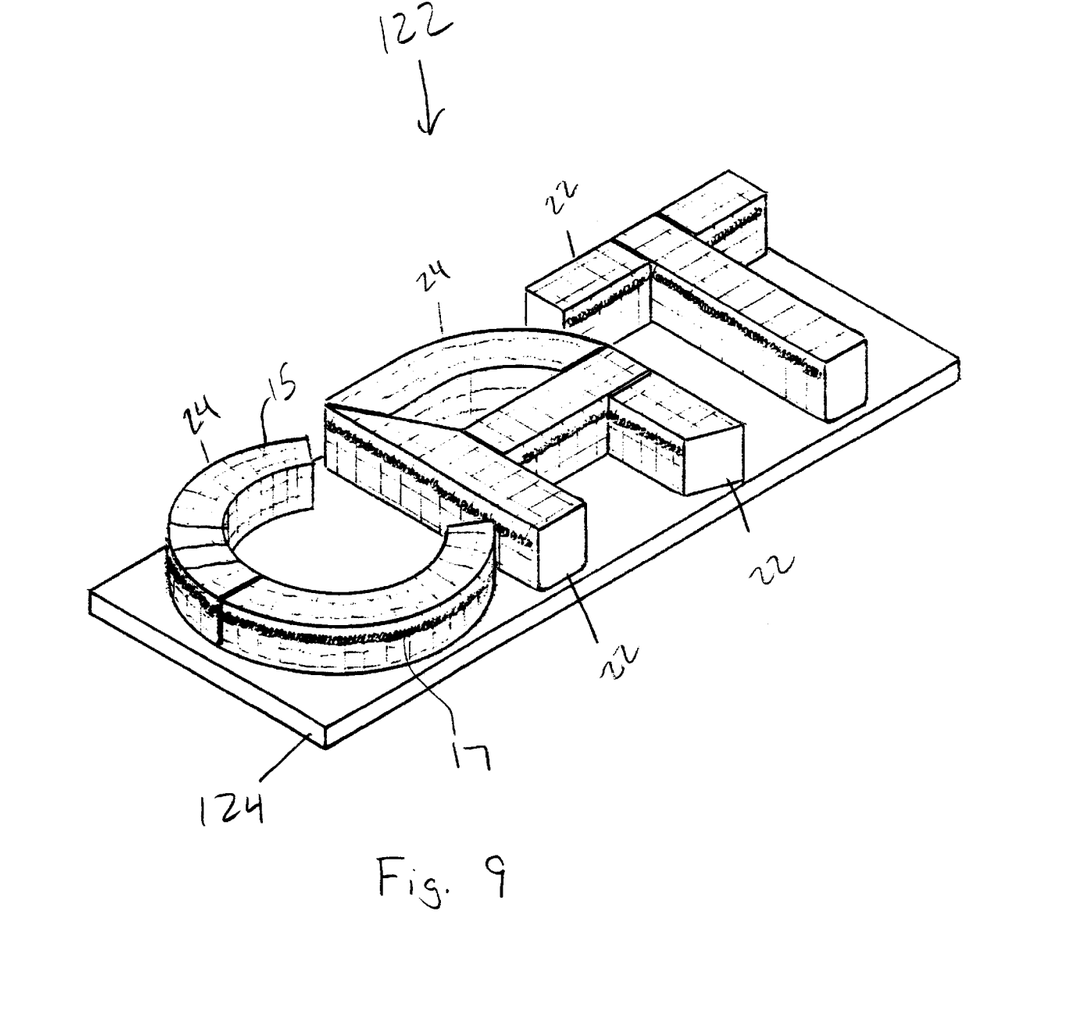
FIG. 9 a perspective exploded view of a planter in the shape of a word "CAT" according to the present invention.

FIGS. 6–9 show different straight 22 and curved 24 configurations of the U-channel 12 that are use to form letters. Each U-channel 12 is first prepared as described above and then mounted together. FIG. 6 shows the manufacturing of the letter "E" 110 by mounting each U-channel 12 on an "E" shaped board 112. FIG. 7 shows the manufacturing of the letter "D" 114 by mounting each U-channel 12 on an wire surface 116. FIG. 8 shows the manufacturing of the letter "M" 118 by mounting each U-channel 12 on a rectangular board 120. FIG. 9 shows the manufacturing of the word "CAT" 122 by mounting each U-channel 12 on a single board 124. Mounting or hanging of the U-channel planter 10 can be by any of the ways known in the art of mounting such materials together. This includes using holes (not shown) in the bottom of the U-channel 12 for tie wires or bolts and various methods sealing these holes if desired by the user.

While different embodiments of the invention has been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A method of assembling a planter that includes a container, soil retention wrap and first wrap retainer comprising:

a. mounting the first wrap retainer to the container if the first wrap retainer is not part of the container;

b. filling the container with planting material;

c. attaching a first end of the soil retention wrap to the first wrap retainer;

d. wrapping the soil retention wrap around the container, thereby covering an open area of the container in order to retain the planting material in the container; and e. attaching a second end of the soil retention wrap to the first wrap retainer after the second end has been wrapped around the container to lock the soil retention wrap around the container.

2. The method of claim 1, further including a second wrap retainer, whereby the first and second retainers are attached to or part of the container and border the open area; wherein step (d) is replaced by covering the open area with the soil retention wrap; and step (e) is replaced by attaching a second end of the soil retention wrap to the second wrap retainer in order to lock the soil retention wrap over the open area and to the container.

3. The method of claim 1, wherein said soil retention wrap is a netting and said wrap retainer is a spring.

4. The method of claim 3, wherein the netting includes netting holes defined an upper, lower and two side strands of the netting; wherein a first end of the netting is attached the spring by placing at a first side strand of a first netting hole between a first set of two coils of the spring, stretching the first netting hole along the spring until the upper and lower strands of the first hole are taut, placing second side strand of the first netting hole between a second set of two coils of the spring, stretching the netting again so that upper and lower strands of an adjacent second netting hole which shares the second side strand of the first netting hole taut, placing a third side strand which also defines the second netting hole between a third set of two coils of the spring, repeating the attachment of remaining netting holes of the first end until the width of the netting has been attached along the spring; wrapping the netting around the container, so that part of the netting covers the open area of the container and a second end of the netting is wrapped the spring; attaching netting holes near the second end of the netting which are closest to the spring to the spring in the same manner described for attaching the first end of the netting to the spring; and cutting away any excess netting on the second end of the netting which extends pass the spring.

5. The method of claim 1, further including the forming of shapes and letters by using a plurality of said container, whereby said containers are of round, straight and curved configurations assembled together to form the desired shape or letter.

6. A planter for holding planting material comprising:
   a container having two sides, a bottom and an open top, said sides and bottom being of a material to enclose and hold in place said planting material;
   a soil retention wrap wrapping around said container to retain said planting materials in said container at said open top; and
   a wrap retainer extending from an outside surface of said container to retain said soil retention wrap around said container, wherein said wrap retainer is a spring.

7. The planter of claim 6, further including a groove around an outside surface of said container to receive said spring.

8. The planter of claim 6, further including tie holes in an outside surface of said container and ties as said fasteners to mount said spring to said container.

9. The planter of claim 6, further including a first spring as said wrap retainer attached to one side of said container and bordering said open top; a second spring as said wrap retainer attached to another side of said container and bordering said open top; and wherein a first end of said soil retention wrap attaches to said first spring and wherein a second end of said soil retention wrap attaches to said second spring.

10. The planter of claim 6, wherein said soil retention wrap is a netting; said netting includes netting holes; and said netting holes are placed over individual coils of said spring to interlock said netting to said spring.

11. The planter of claim 6, wherein said soil retention wrap is a netting.

12. The planter of claim 11, wherein said netting is in the form of a plurality of netting strips individually wrapped around said container.

13. A planter for holding planting material comprising:
   a container having two sides, a bottom and an open top, said sides and bottom being of a material to enclose and hold in place said planting material, and said open top formed between said sides and bottom, whereby said open top allows plants to grow and extend outward from said planting material and away from said container;
   a soil retention wrap in the form of a sheet of material wrapping around said two sides, bottom and open top to retain said planting materials in said container and prevent said planting materials from falling out from said open top when said container is hung in such a way that said bottom and said open top are in a more vertical than horizontal position whereby the planting material would otherwise fall from said container without said retention wrap; and
   a wrap retainer extending from an outside surface of said container which is adapted for hooking said soil retention wrap in place to retain said soil retention wrap around said container when said container is hung in such a way that said bottom and said open top are in a more vertical than horizontal position.

14. The planter of claim 1, further including a valve extending from said container to provide water to the planting material inside said container and a water source connected to said valve.

15. The planter of claim 1, further including fasteners to fasten said wrap retainer to said container.

16. The planter of claim 1, wherein said sides and bottom of said container form a channel to hold said planting material.

17. The planter of claim 16, wherein said channel is U-shaped.

18. The planter of claim 16, wherein said channel runs in a shape of a circle.

19. The planter of claim 16, wherein said channel runs in a shape of a straight line.

20. The planter of claim 16, wherein said channel runs in a shape of a curve line.

21. The planter of claim 1, wherein said wrap retainer is a spring.

22. The planter of claim 21, further including a groove around an outside surface of said container to receive said spring.

23. The planter of claim 1, further including a first wrap retainer attached to one side of said container and bordering said open top; a second wrap retainer attached to another side of said container and bordering said open top; and wherein a first end of said soil retention wrap attaches to said first wrap retainer and wherein a second end of said soil retention wrap attaches to said second wrap retainer.

24. The planter of claim 1, wherein said soil retention wrap is a netting.

25. The planter of claim 7, wherein said netting is in the form of a plurality of netting strips individually wrapped around said container.

26. The planter of claim 7, wherein said netting includes netting holes; wherein said wrap retainer is a spring; and wherein said netting holes are placed over individual coils of said spring to interlock said netting to said spring.

* * * * *